United States Patent
Burrows

(10) Patent No.: US 10,465,435 B2
(45) Date of Patent: Nov. 5, 2019

(54) THERMALLY INSULATIVE GAS REPLACEMENT SYSTEM FOR VACUUM INSULATING GLASS UNITS

(71) Applicant: Cardinal CG Company, Eden Prairie, MN (US)

(72) Inventor: Keith James Burrows, Mineral Point, WI (US)

(73) Assignee: CARDINAL CG COMPANY, Eden Prairie, MN (US)

( * ) Notice: Subject to any disclaimer, the term of this patent is extended or adjusted under 35 U.S.C. 154(b) by 154 days.

(21) Appl. No.: 15/425,406

(22) Filed: Feb. 6, 2017

(65) Prior Publication Data

US 2018/0223590 A1 Aug. 9, 2018

(51) Int. Cl.
| | | |
|---|---|---|
| *E06B 3/677* | (2006.01) | |
| *E06B 3/66* | (2006.01) | |
| *E06B 3/67* | (2006.01) | |
| *E06B 3/663* | (2006.01) | |

(52) U.S. Cl.
CPC ............ *E06B 3/677* (2013.01); *E06B 3/6612* (2013.01); *E06B 3/66366* (2013.01); *E06B 3/6715* (2013.01); *E06B 3/66309* (2013.01); *Y02A 30/25* (2018.01); *Y02B 80/24* (2013.01)

(58) Field of Classification Search
CPC .... E06B 3/677; E06B 3/6612; E06B 3/66366; E06B 3/6715; E06B 3/66309; Y02B 80/24; Y02A 30/25
See application file for complete search history.

(56) References Cited

U.S. PATENT DOCUMENTS

| | | |
|---|---|---|
| 4,928,448 A | 5/1990 | Phillip et al. |
| 5,027,574 A | 7/1991 | Phillip et al. |
| 5,732,517 A | 3/1998 | Milikovsky |
| 6,399,169 B1 | 6/2002 | Wang et al. |
| 6,444,281 B1 | 9/2002 | Wang et al. |
| 6,453,365 B1 | 9/2002 | Habot |
| 7,101,810 B2 | 9/2006 | Bond et al. |
| 7,192,648 B2 | 3/2007 | Hartig et al. |
| 7,851,034 B2 | 12/2010 | Cooper |
| 8,658,262 B2 | 2/2014 | Myli et al. |
| 9,376,853 B2 | 6/2016 | Hartig |
| 9,453,365 B2 | 9/2016 | Myli et al. |

(Continued)

FOREIGN PATENT DOCUMENTS

EP 2324183 A2 5/2011

OTHER PUBLICATIONS

International Patent Application No. PCT/US2018/014422, International Search Report and Written Opinion dated Jul. 25, 2018, 15 pages.

*Primary Examiner* — Donald J Loney
(74) *Attorney, Agent, or Firm* — Fredrikson & Byron, P.A.

(57) ABSTRACT

The invention provides a vacuum insulating glass unit with two panes assembled in a spaced-apart configuration so as to have a between-pane space located between them. The between-pane space has a high vacuum. The vacuum insulating glass unit also includes a bleed chamber filled with an insulative gas at a pressure higher than atmospheric pressure and configured such that over time insulative gas from the bleed chamber diffuses into the between-pane space.

39 Claims, 3 Drawing Sheets

(56) References Cited

U.S. PATENT DOCUMENTS

| | | | |
|---|---|---|---|
| 2009/0142521 A1* | 6/2009 | Cooper | E06B 3/6612 428/34 |
| 2012/0202075 A1* | 8/2012 | Jones | E06B 3/6612 428/441 |
| 2014/0291448 A1* | 10/2014 | Luck | B64B 1/14 244/123.14 |
| 2015/0218042 A1 | 8/2015 | Hogan et al. | |

* cited by examiner

THERMALLY INSULATIVE GAS REPLACEMENT SYSTEM FOR VACUUM INSULATING GLASS UNITS

FIELD OF THE INVENTION

The present invention relates to insulating glass units. In particular, this invention relates to vacuum insulating glass units.

BACKGROUND OF THE INVENTION

Windows are one of the primary sources of heat loss in architectural structures. One way to reduce such heat loss is by providing vacuum insulating glass units. Conventional vacuum insulating glass (VIG) units include two spaced apart glass panes that enclose an evacuated or low pressure space. The low pressure in the between-pane space reduces or eliminates convective heat transfer between the glass panes.

VIG units can be fabricated in different configurations that allow the glass panes to be spaced apart while maintaining a vacuum in the between-pane space. In one configuration, a spacer is placed between the two glass panes. The spacer forms a seal between the two glass panes to enclose the between-pane space and maintain a vacuum therein. Such an arrangement provides structural stability, but a common issue with this configuration is a gradual loss of vacuum over time due to permeability of the seals. With a conventional VIG unit, when vacuum is lost, air enters the between-pane space and can bring with it moisture. This reduces the insulating effect provided by an evacuated or low pressure space.

In other configurations, instead of using a spacer, the edges of the two glass panes are fused together to form a seal. In this arrangement, an array of small metal pillars or cylinders is typically placed between the two panes to keep them from collapsing due to the vacuum in the between-pane space. This configuration is initially more air-tight than VIG units sealed with spacers. This type of arrangement, however, may provide less structural stability. For example, the fused edges of the glass panes tend to have little, if any, flexibility. As a result, the edges of these units tend to be somewhat brittle and thus more fragile than would be ideal.

It would be desirable to provide a VIG unit that effectively maintains good thermal insulating properties in addition to being structurally robust.

SUMMARY

Figure 1:
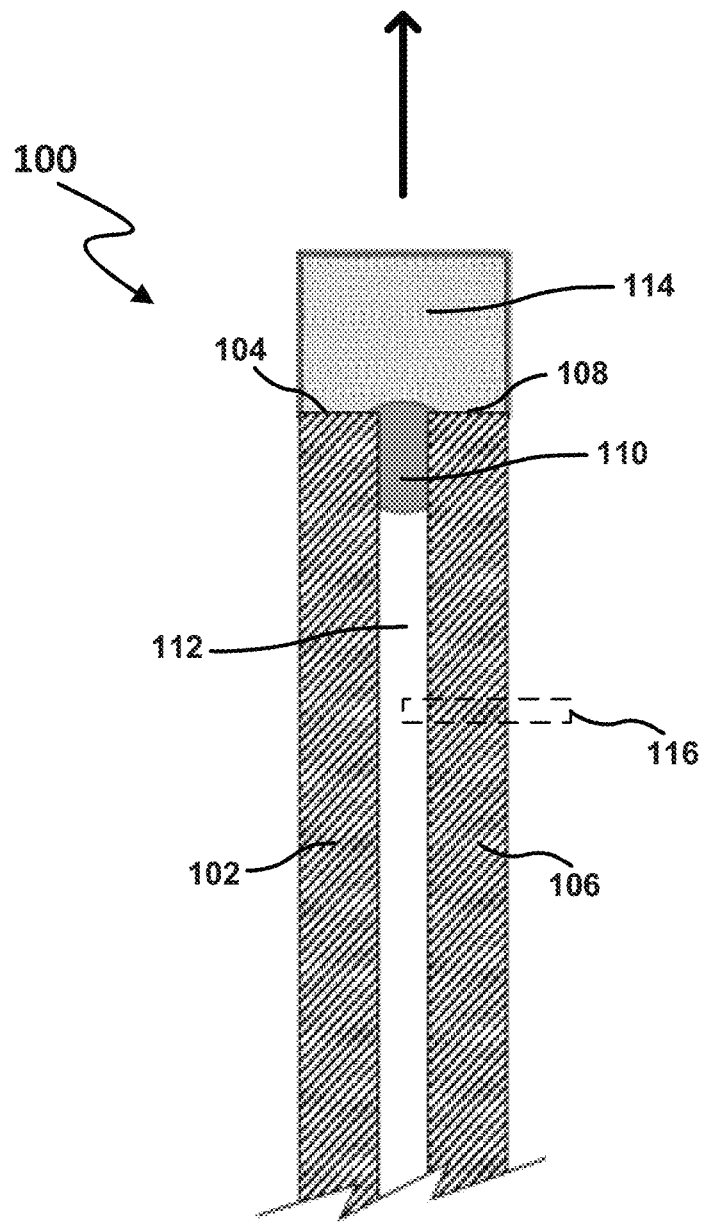
FIG. 1 is a partially broken-away schematic cross-sectional end view of a vacuum insulating glass unit in accordance with an embodiment of the present invention, wherein a bleed chamber is located along the perimeter of two panes of the vacuum insulating glass unit.

In some embodiments, the invention provides a vacuum insulating glass unit with two panes assembled in a spaced-apart configuration so as to have a between-pane space located between them. The between-pane space has a high vacuum. The vacuum insulating glass unit also includes a bleed chamber filled with an insulative gas at a pressure higher than atmospheric pressure and configured such that over time insulative gas from the bleed chamber diffuses into the between-pane space.

DETAILED DESCRIPTION

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The present invention provides a thermally insulative gas replacement system for vacuum insulating glass (VIG) units. The system offers exceptional performance in terms of providing a structurally robust VIG unit while maintaining good thermal insulation properties. A seal is provided between two glass panes of the VIG unit. This can adhere the two panes together, provide a gas and moisture barrier, and space the two panes apart so as to form a between-pane space. A bleed chamber containing insulative gas at a pressure higher than atmospheric pressure can be provided adjacent to (e.g., surrounding) the between-pane space. As a result, if the seal between the glass panes exhibits some permeability over time, the insulative gas can diffuse into the between-pane space, rather than simply having air diffuse into the unit. The bleed chamber can thus mitigate the reduction in thermal insulation properties that can result when the seal of a VIG unit has some permeability over time.

For many applications, each pane will comprise a transparent (or at least translucent) material, such as glass or clear plastic. For example, each pane is a glass sheet (e.g., a window pane) in certain embodiments. A variety of known glass types can be used, such as soda-lime glass. In some cases, it may be desirable to use "white glass," a low iron glass, etc. In certain embodiments, the panes are part of a window, door, skylight, or other glazing.

Panes of various sizes can be used in the present invention. Commonly, large-area panes are used. Certain embodiments involve panes having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some embodiments, the panes are jumbo glass sheets having a length and/or width that is between about 3 meters and about 10 meters, e.g., glass sheets having a width of about 3.5 meters and a length of about 6.5 meters. Panes having a length and/or width of greater than about 10 meters are also anticipated.

Panes of various thicknesses can be used in the present invention. In some embodiments, the panes (which can optionally be glass sheets) have a thickness of about 1-8 mm. Certain embodiments involve panes with a thickness of between about 2.3 mm and about 4.8 mm, and perhaps more preferably between about 2.5 mm and about 4.8 mm. In one particular embodiment, sheets of glass (e.g., soda-lime glass) with a thickness of about 3 mm are used.

FIG. 1 is a schematic cross-sectional end view of VIG unit 100 in accordance with an embodiment of the present invention. VIG unit 100 includes glass pane 102 with edge 104, glass pane 106 with edge 108, seal 110, between-pane space (or "evacuated space" or "vacuum chamber") 112, and bleed chamber (or "insulative gas chamber") 114. Glass pane 102 and glass pane 106 are assembled in a spaced apart configuration using seal 110. An array of conventional VIG unit pillars may be provided between glass panes 102 and 106 to keep them from collapsing due to the low pressure in between-pane space 112. Edges 104 and 108 of glass panes 102 and 106 are part of an edge region that delineates a perimeter of VIG unit 100. Glass panes 102 and 106 define confronting interior surfaces, which, along with seal 110, form (i.e., bound) between-pane space 112.

Bleed chamber 114 is located along the perimeter of VIG unit 100. In the embodiment of FIG. 1, bleed chamber 114 has a greater width (i.e., measured perpendicular to the major surfaces of the glass panes) than does between-pane space 112. Here, bleed chamber 114 is bounded by (e.g., encased by) a housing. As shown in FIG. 1, the housing of the bleed chamber preferably is separate from the glass panes. The housing, for example, can be formed of metal. Plastic is another possibility. In some cases, the housing can be formed of a ceramic. If desired, the housing can be formed of rubber. The housing preferably has a width that is substantially equal to, equal to, or less than the width of spaced-apart panes 102 and 106, as shown in FIG. 1. In some embodiments, bleed chamber 114 has an annular configuration. For example, the annular configuration of bleed chamber 114 can optionally surround (e.g., entirely surround) between-space 112.

Preferably, bleed chamber 114 is located peripherally outside (i.e., in the direction of the arrow in FIG. 1) the edges 104 and 108 of glass panes 102 and 106. Bleed chamber 114, or a housing encasing bleed chamber 114, can be mounted against edges 104 and 108 of glass panes 102 and 106, as shown in FIG. 1. Thus, bleed chamber 114 can be encased by a housing adjacent to (e.g., against) edges 104 and 108 of panes 102 and 106.

Seal 110 creates a seal between glass pane 102 and glass pane 106. The seal created by seal 110 extends about the perimeter of VIG unit 100 between bleed chamber 114 and between-pane space 112. In the embodiment of FIG. 1, seal 110 separates bleed chamber 114 from between-pane space 112. In more detail, the illustrated seal 110 is located inwardly of bleed chamber 114 and between-pane space 112 is located inwardly of seal 110.

In general, seal 110 can take the form of any geometric shape, such as spherical, cylindrical, square, rectangular, rod-like, bead-like, oval, or trapezoidal. Seal 110 can be formed of solder glass, a polymer (e.g., Teflon), plastic, ceramic, glass, metal, or any other suitable material. In some embodiments, a low vapor pressure, low gas permeability adhesive is used. In other embodiments, a hot-melt butyl and/or any other suitable adhesive or bonding agent is used. Preferably, seal 110 creates a substantially hermetic seal between glass pane 102 and glass pane 106. In these embodiments, seal 110 can be made of solder glass, indium, rubber, silicone rubber, butyl rubber, or any other suitable material. In some cases, seal 110 is a glass frit. In such cases, the glass frit can optionally comprise bismuth oxide, vanadium oxide, barium oxide, and zinc oxide. Suitable frits are described in U.S. patent application publication 2015/0218042, the contents of which are incorporated herein by reference.

In certain embodiments, seal 110 consists of a single bead of polymer sealant. In these and other embodiments, seal 110 is devoid of metal (e.g., has no conventional metal spacer or any metal film or metal foil). Preferably, seal 110 is devoid of glass. Thus, a single bead of sealant comprising (or consisting of) polymer can optionally be the only thing separating the insulative gas in bleed chamber 114 and the low pressure atmosphere in between-pane space 112. In such cases, there is no additional rigid spacer wall therebetween. In FIG. 1, seal 110 is exposed to both the insulative atmosphere in bleed chamber 114 and the low pressure atmosphere in between-pane space 112.

Between-pane space 112 provides a low thermal conductivity environment. In order to provide such an environment, between-pane space 112 has a high vacuum such that convective heat transfer between glass panes 102 and 106 is significantly reduced or eliminated. As used herein, a high vacuum is a substantially evacuated space having a pressure between 0.001 torr and $10^{-9}$ torr. Preferably, the high vacuum in between-pane space 112 is characterized by a gas pressure of 0.00085 torr or lower. In some embodiments, the high vacuum in between-pane space 112 is characterized by a gas pressure of between 0.0008 torr and $10^{-9}$ torr.

Bleed chamber 114 is filled with thermally insulative gas at a pressure higher than atmospheric pressure. Preferably, the pressure in bleed chamber 114 is 765 torr or higher. In some embodiments, the pressure in bleed chamber 114 is 770 torr or higher.

The thermally insulative gas preferably is a noble gas. For example, the insulative gas can be argon, krypton, xenon, or a combination thereof. Bleed chamber 114 may be filled with a mix of air and one or more thermally insulative gases, such as 90% argon and 10% air. Preferably, the bleed chamber is 90% or more argon, such as 95% or more argon, with the remainder optionally being air.

Bleed chamber 114 preferably has a volume that is at least 25% that of between-pane space 112. In some cases, the bleed chamber volume is at least 50% as great as the between-pane space volume. In certain preferred embodiments, the bleed chamber volume is greater than (e.g., between 105% and 175%) the between-pane space volume. Any one of the relative volume ranges noted in this paragraph can be used in any embodiment of the present disclosure.

Over time, seal 110 between glass pane 102 and glass pane 106 may exhibit some permeability. In a typical VIG unit, when this occurs, ambient air will enter the evacuated space, creating a rise in pressure and causing a significant reduction in the insulative effects of the between-pane space. In contrast, VIG unit 100 is advantageous because bleed chamber 114 not only provides a buffer between ambient air and between-pane space 112, but also provides a mechanism for having thermally insulative gas diffuse into between-pane space 112 over time.

If seal 110 between glass panes 102 and 106 has some permeability or is weakened, insulative gas from bleed chamber 114 will tend to diffuse into between-pane space 112 instead of ambient air. The pressure of the insulative gas within bleed chamber 114 tends to ensure that the insulative gas diffuses into between-pane space 112 instead of ambient air, which is at a lower pressure than the insulative gas within bleed chamber 114. This mitigates the loss of thermal insulation that occurs when the seal exhibits some permeability, is weakened over time, or both. VIG unit 100 both provides structural stability and effectively maintains good thermal insulation properties in between-pane space 112.

In some embodiments, VIG unit 100 includes additional components to increase thermal insulation properties of VIG unit 100. For example, VIG unit 100 preferably includes a low-emissivity coating on at least one surface of glass pane 102 and/or glass pane 106 to minimize heat loss due to radiation. A variety of low-emissivity coatings are well known in the present art. Suitable low-emissivity coatings are disclosed in U.S. Pat. Nos. 9,376,853, 7,192,648, and 7,101,810, the contents of which are incorporated herein by reference. Advantageous low-emissivity coatings are commercially available from Cardinal CG Company of Spring Green, Wis., USA. Additionally or alternatively, one or both exterior surfaces of the VIG unit can optionally have a transparent conductive oxide coating. Suitable coatings of this nature are described in U.S. Pat. Nos. 8,658,262 and 9,453,365, the contents of which are incorporated herein by reference.

Figure 2:
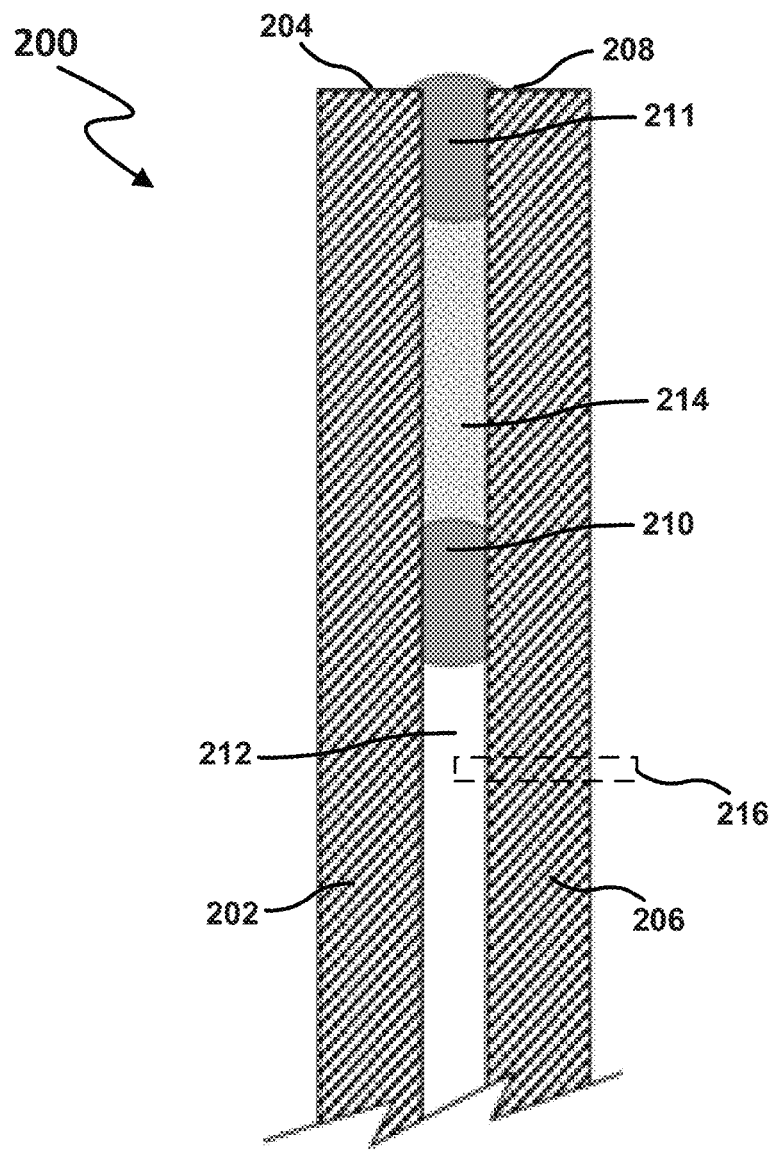
FIG. 2 is a partially broken-away schematic cross-sectional end view of a vacuum insulating glass unit in accordance with another embodiment of the invention, wherein a bleed chamber is located between two panes of the vacuum insulating glass unit.

FIG. 2 is a schematic cross-sectional end view of VIG unit 200 in accordance with another embodiment of the invention. VIG unit 200 includes glass pane 202 with edge 204, glass pane 206 with edge 208, first seal 210, second seal 211, between-pane space 212, and bleed chamber 214. Glass pane 202 and glass pane 206 are assembled in a spaced apart configuration using seals 210 and 211. Edges 204 and 208 of glass panes 202 and 206 are part of an edge region that delineates a perimeter of VIG unit 200. Glass pane 202 and glass pane 206 define confronting interior surfaces, which, along with seal 210, form (i.e., bound) between-pane space 212.

Bleed chamber 214 is located along the perimeter of VIG unit 200, between seal 210 and seal 211. Bleed chamber 214 is located peripherally inside of edges 204 and 208 of glass panes 202 and 206. First seal 210 creates a first seal between glass pane 202 and glass pane 206. First seal 210 separates bleed chamber 214 from between-pane space 212. Thus, first seal 210 is exposed to both the insulative gas in bleed chamber 214 and the low pressure atmosphere in between-pane space 112. Second seal 211 creates a second seal between glass pane 202 and glass pane 206. Second seal 211 separates bleed chamber 214 from the ambient air surrounding VIG unit 200. Thus, second seal 211 is exposed to both the insulative gas in bleed chamber 214 and the ambient air surrounding VIG unit 200.

Preferably, bleed chamber 214 is located inwardly of second seal 211, first seal 210 is located inwardly of bleed chamber 214, and between-pane space 112 is located inwardly of first seal 210. Seals 210 and 211 can be substantially similar to seal 110, which was described above with respect to FIG. 1. For example, each of seals 210 and 211 can optionally consist of single bead of polymer sealant. In these and other embodiments, seals 210 and 211 are each devoid of metal. Preferably, these seals 210 and 211 are devoid of glass. As shown in FIG. 2, first seal 210 is the only thing separating the insulative gas in bleed chamber 214 from the low pressure atmosphere in between-pane space 212. Thus, there is no additional rigid spacer wall there between. Similarly, in FIG. 2, second seal 211 is the only thing separating the insulative gas in bleed chamber 214 from the ambient air surrounding VIG unit 200.

Like between-pane space 112 in FIG. 1, between-pane space 212 provides a low thermal conductivity environment. In order to provide such an environment, between-pane space 212 has a high vacuum such that convective heat transfer between glass panes 202 and 206 is significantly reduced or eliminated. Preferably, the high vacuum in between-pane space 212 is characterized by a gas pressure of 0.00085 torr or lower. In some embodiments, the high vacuum in between-pane space 212 is characterized by a gas pressure of between 0.0008 torr and $10^{-9}$ torr.

Like bleed chamber 114 in FIG. 1, bleed chamber 214 is filled with thermally insulative gas at a pressure higher than atmospheric pressure. Preferably, the pressure in bleed chamber 114 is 765 torr or higher. In some embodiments, the pressure in bleed chamber 214 is 770 torr or higher. The insulative gas can be argon, krypton, xenon, or a combination thereof. Bleed chamber 214 may be filled with a mix of air and one or more thermally insulative gases, such as 90% argon and 10% air.

Over time, the seal between glass pane 202 and glass pane 206 formed by first seal 210 may exhibit some permeability. In a typical VIG unit, when this occurs, ambient air will enter the evacuated space, creating a rise in pressure and causing a significant reduction in the insulative effects of the between-pane space. In contrast, VIG unit 200 is advantageous because bleed chamber 214 not only provides a buffer between ambient air and between-pane space 212, but also provides a mechanism for having thermally insulative gas diffuse into between-pane space 212 over time.

If first seal 210 between glass panes 202 and 206 has some permeability or is weakened, insulative gas from bleed chamber 214 will tend to diffuse into between-pane space 212 instead of ambient air. The pressure of insulative gas within bleed chamber 214 tends to ensure that the insulative gas diffuses into between-pane space 212 instead of ambient air, which is at a lower pressure than the insulative gas within bleed chamber 214. This mitigates the loss of thermal insulation that occurs when the seal exhibits some permeability, is weakened, or both. VIG unit 200 both provides structural stability and effectively maintains good thermal insulation properties.

In some embodiments, VIG unit 200 includes additional components to increase the thermal insulation properties of VIG unit 200. For example, VIG unit 200 preferably includes a low-emissivity coating on at least one surface of glass pane 202 and/or glass pane 206 to minimize heat loss due to radiation. Additionally or alternatively, one or both exterior surfaces of the VIG unit can optionally have a transparent conductive oxide coating.

Figure 3:
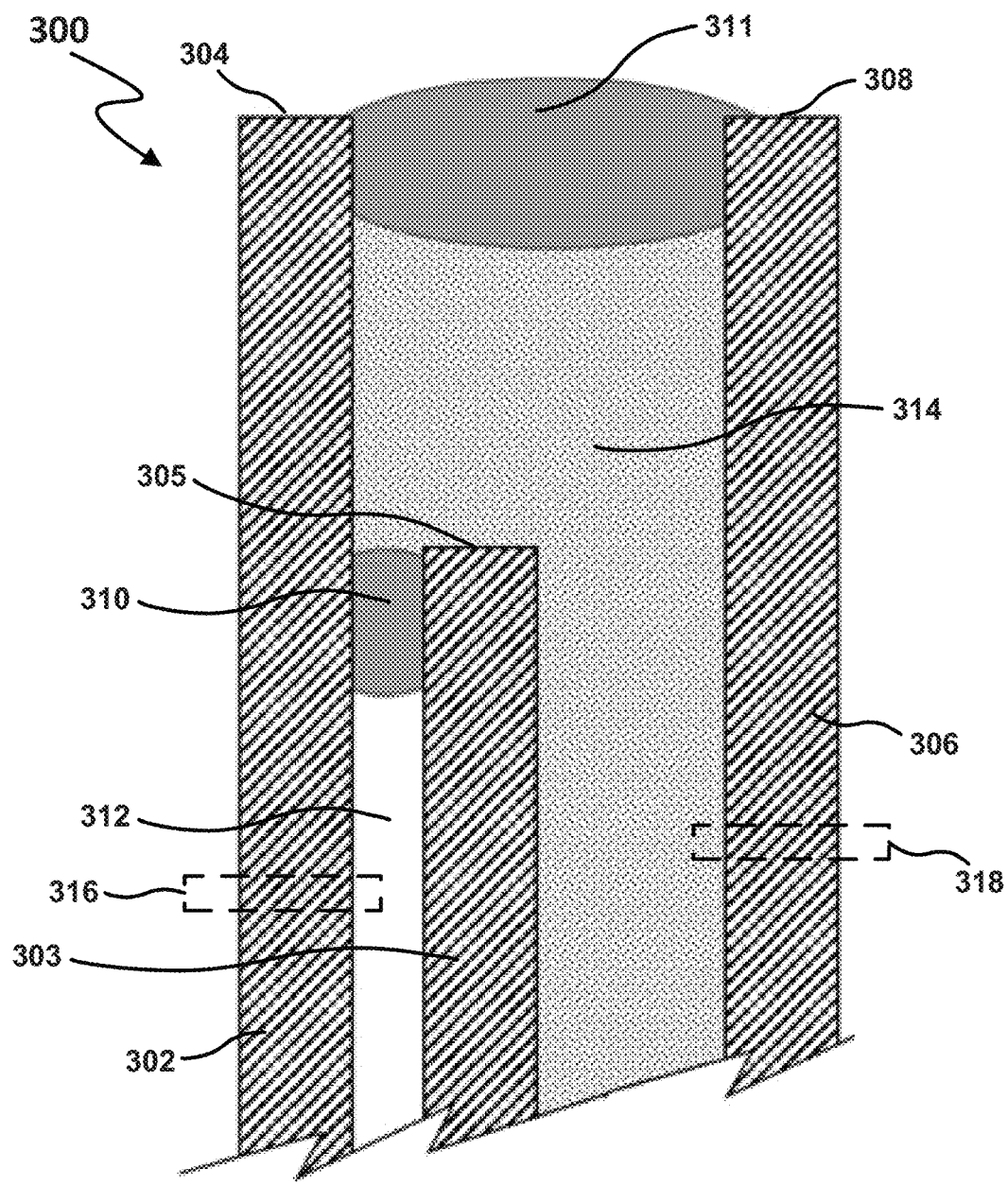
FIG. 3 is a partially broken-away schematic cross-sectional end view of a vacuum insulating glass unit in accordance with still another embodiment of the invention, wherein the vacuum insulating glass unit includes a low pressure space between a first glass pane and a second glass pane, as well as a bleed chamber between the second glass pane and a third glass pane.

FIG. 3 is a schematic cross-sectional end view of VIG unit 300 in accordance with still another embodiment of the invention. VIG unit 300 includes glass pane 302 with edge 304, glass pane 303 with edge 305, glass pane 306 with edge 308, first seal 310, second seal 311, between-pane space 312, and bleed chamber 314. Glass pane 302 and glass pane 303 are assembled in a spaced-apart configuration using first seal 310. Glass pane 302 and glass pane 306 are assembled in a spaced apart configuration using second seal 311. Between-pane space 312 is located between (e.g., bounded by confronting surfaces of) glass panes 302 and 303. Glass panes 302, 303, and 306 are assembled with seals 310 and 311 such that glass pane 303 is also spaced apart from glass pane 306. Edges 304 and 308 of glass panes 302 and 306 are part of an edge region that delineates a perimeter of VIG unit 300. Glass pane 302 and glass pane 303 define confronting interior surfaces, which, along with first seal 310, form (i.e., bound) between-pane space 312.

Part of bleed chamber 314 is located along the perimeter of VIG unit 300, between first seal 310 and second seal 311. That portion of bleed chamber 314 is referred to as the outer region of bleed chamber 314. First seal 310 separates bleed chamber 314 from between-pane space 312. Thus, first seal 310 is exposed to both the insulative gas in bleed chamber 314 and the low pressure atmosphere in between-pane space 312. Bleed chamber 314 is located peripherally inside of edges 304 and 308 of glass panes 302 and 306. Bleed chamber 314 includes a central region, which is located between (e.g., bounded by) glass pane 303 and glass pane 306. In the embodiment of FIG. 3, glass pane 303 is surrounded (e.g., the entire perimeter defined by edge 305 is surrounded) by bleed chamber 314. First seal 310 creates a seal between glass pane 302 and glass pane 303. The seal created by first seal 310 extends between bleed chamber 314 and between-pane space 312. Second seal 311 creates a seal between glass pane 302 and glass pane 306. The seal created by second seal 311 extends about the perimeter of VIG unit 300 between bleed chamber 314 and ambient air surrounding VIG unit 300.

Seals 310 and 311 can be substantially similar to seal 210 described above with respect to FIG. 2 and seal 110 described above with respect to FIG. 1. For example each of seals 310 and 311 can optionally consist of a single bead of polymer sealant. In these and other embodiments, seals 310 and 311 are each devoid of metal. Preferably, seals 310 and 311 are devoid of glass. As shown in FIG. 3, first seal 310 is the only thing separating the insulative gas in bleed chamber 314 from the low pressure atmosphere in between-pane space 312. Thus, there is no additional spacer wall there between. Similarly, in FIG. 3, second seal 311 is the only thing separating the insulative gas in bleed chamber 314 from the ambient air surrounding VIG unit 300.

Between-pane space 312 provides a low thermal conductivity environment. In order to provide such an environment, between-pane space 312 has a high vacuum such that convective heat transfer between glass panes 302 and 303 is significantly reduced or eliminated. Preferably, the high vacuum in between-pane space 312 is characterized by a gas pressure of 0.00085 torr or lower. In some embodiments, the high vacuum in between-pane space 312 is characterized by a gas pressure of between 0.0008 torr and $10^{-9}$ torr.

Bleed chamber 314 is filled with thermally insulative gas at a pressure higher than atmospheric pressure. Preferably, the pressure in bleed chamber 114 is 765 torr or higher. In some embodiments, the pressure in bleed chamber is 770 torr or higher. The insulative gas can be argon, krypton, xenon, or a combination thereof. Bleed chamber 314 may be filled with a mix of air and one or more thermally insulative gases, such as 90% argon and 10% air.

Over time, the seal between glass pane 302 and glass pane 303 formed by first seal 310 may exhibit some permeability. In a typical VIG unit, when this occurs, ambient air will enter the evacuated space, creating a rise in pressure and causing a significant reduction in the insulative effects of the between-pane space. In contrast, VIG unit 300 is advantageous, because bleed chamber 314 not only provides a buffer between ambient air and between-pane space 312, but it also provides a mechanism for having thermally insulative gas diffuse into between-pane space 312 over time.

If the seal between first seal 310 and glass panes 302 and 303 has some permeability or is weakened, insulative gas from bleed chamber 314 will tend to diffuse into between-pane space 312 instead of ambient air. The pressure of the insulative gas within bleed chamber 314 tends to ensure that the insulative gas diffuses into between-pane space 312 instead of ambient air, which is at a lower pressure than the insulative gas within bleed chamber 314. This mitigates the loss of thermal insulation that occurs when the seal exhibits some permeability, is weakened, or both. The configuration of VIG unit 300 also provides resistance to ambient air entering between-space 312 through glass pane 303. VIG unit 300 both provides structural stability and effectively maintains good thermal insulation properties.

In some embodiments, VIG unit 300 includes additional components to increase the thermal insulation properties of VIG unit 300. For example, VIG unit 300 preferably includes a low-emissivity coating on at least one surface of glass pane 302, glass pane 303, and/or glass pane 306 to minimize heat loss due to radiation.

The embodiment of FIG. 3 can advantageously provide a particularly large volume of thermally insulative gas. In some cases, the bleed chamber 314 volume is greater than 150%, or even greater than 200%, of the between-pane space 312 volume.

The VIG unit in any embodiment of the present disclosure can optionally have one or more evacuation and/or fill tubes 116, 216, 316, 318. As shown in FIGS. 1-3, such a tube 116, 216, 316, 318 can optionally be mounted on the VIG unit so as to extend through a hole in one of the panes. In some cases, one end of an evacuation tube 116, 216, 316 communicates with (e.g., projects into or is otherwise open to) the between-pane space/vacuum chamber 112, 212, 312. Additionally or alternatively, a fill tube can be provided such that one of its ends communicates with (e.g., projects into or is otherwise open to) the bleed chamber. In the embodiments of FIGS. 1-3, an evacuation tube 116, 216, 316 is mounted on the VIG unit at a location peripherally inward of (i.e., in a direction opposite that of the arrow in FIG. 1) one or each seal 110, 210, 211, 311 of the VIG unit. In other cases, an evacuation tube or passage extending through the edge region of the VIG unit is provided.

If desired, the VIG unit in any embodiment of the present disclosure can be provided with one port for evacuation, while another port is provided for filling the bleed chamber with thermally insulative gas. In such cases, one end of a first tube communicates with (e.g., projects into or is otherwise open to) the between-pane space/vacuum chamber, while one end of a second tube communicates with (e.g., projects into or is otherwise open to) the bleed chamber. In the embodiment of FIG. 3, for example, VIG unit 300 is shown with one tube 316 configured for evacuating the between-pane space 312, and another tube 318 configured for filing the bleed chamber 314 with insulative gas. The VIG unit 300 of FIG. 3, however, is by no means required to have an evacuation and/or fill tube.

VIG unit 100 could be manufactured by assembling two panes of glass together with an outer seal (and, optionally, with spacers to maintain the glass separation distance), attaching the bleed chamber, and evacuating the cavity through an evacuation tube (either in the glass or in the edge seal). VIG unit 200 could be manufactured by assembling two panes of glass with an outer edge seal (211) and an inner edge seal (210) (and, optionally, with spacers to maintain the glass separation distance). When first assembled, the entire cavity could contain the bleed gas, and subsequently the inner cavity (212) could then be evacuated using an evacuation port in one of the glass panes. VIG unit 300 could be manufactured by assembling two different sized panes of glass (302 & 303) with an edge seal (310), then evacuating the cavity 312. Next, an additional pane of glass (306) would be added to the assembly along with a further edge seal (311) possibly containing a metallic, plastic, or ceramic spacer.

While some preferred embodiments of the invention have been described, it should be understood that various changes, adaptations and modifications may be made therein without departing from the spirit of the invention and the scope of the appended claims.

What is claimed is:

1. A vacuum insulating glass unit comprising a first pane and a second pane assembled in a spaced-apart configuration so as to have a between-pane space located between them, the between-pane space having a high vacuum, the vacuum insulating glass unit further comprising a bleed chamber, the bleed chamber being filled with thermally insulative gas at a pressure higher than atmospheric pressure and configured such that over time thermally insulative gas from the bleed chamber diffuses into the between-pane space, the thermally insulative gas being noble gas or a mix of noble gas and air, the pressure in the bleed chamber being characterized by a gas pressure of 765 torr or higher.

2. The vacuum insulating glass unit of claim 1 wherein the gas pressure of the bleed chamber is 770 torr or higher.

3. The vacuum insulating glass unit of claim 1 wherein the high vacuum in the between-pane space is characterized by a gas pressure of 0.00085 torr or lower.

4. The vacuum insulating glass unit of claim 1 wherein the high vacuum in the between-pane space is characterized by a gas pressure of between 0.0008 torr and $10^{-9}$ torr.

5. The vacuum insulating glass unit of claim 1 wherein the bleed chamber has a first volume, the between-pane space has a second volume, and the first volume is at least 25% as great as the second volume.

6. The vacuum insulating glass unit of claim 5 wherein the first volume is greater than the second volume.

7. The vacuum insulating glass unit of claim 1 comprising an edge region delineating a perimeter of the vacuum insulating glass unit, the first and second panes having between them a seal that extends about the perimeter, the bleed chamber located peripherally outside of the edge region.

8. The vacuum insulating glass unit of claim 1 wherein the thermally insulative gas is selected from argon, krypton, and xenon.

9. The vacuum insulating glass unit of claim 1 wherein the vacuum insulating glass unit includes a fill tube having one end in communication with an interior of the bleed chamber.

10. The vacuum insulating glass unit of claim 9 wherein the vacuum insulating glass unit further includes an evacuation tube having one end in communication with an interior of the between-pane space.

11. The vacuum insulating glass unit of claim 1 wherein the first pane and the second pane are the only panes of the vacuum insulating glass unit.

12. The vacuum insulating glass unit of claim 1 wherein the vacuum insulating glass unit is devoid of a metal spacer.

13. The vacuum insulating glass unit of claim 1 wherein the first pane and the second pane have a seal between them, the seal consisting of a single bead of polymer sealant.

14. The vacuum insulating glass unit of claim 1 further comprising a third pane spaced apart from both the first and second panes, wherein the first pane, the second pane, and the third pane are the only panes of the vacuum insulating glass unit.

15. The vacuum insulating glass unit of claim 1 wherein the first pane and the second pane have a seal between them, the seal being made of rubber.

16. A vacuum insulating glass unit comprising a first pane and a second pane assembled in a spaced-apart configuration so as to have a between-pane space located between them, the between-pane space having a high vacuum, the vacuum insulating glass unit further comprising a bleed chamber, the bleed chamber being filled with thermally insulative gas at a pressure higher than atmospheric pressure and configured such that over time thermally insulative gas from the bleed chamber diffuses into the between-pane space, the thermally insulative gas being noble gas or a mix of noble gas and air, the pressure in the bleed chamber being characterized by a gas pressure of 765 torr or higher, the vacuum insulating glass unit comprising an edge region delineating a perimeter of the vacuum insulating glass unit, the first and second panes having between them a seal that extends about the perimeter, the bleed chamber located peripherally outside of the between-pane space, the bleed chamber being encased by a housing that is separate from the first pane and the second pane.

17. The vacuum insulating glass unit of claim 16 wherein the seal is located between the between-pane space and the bleed chamber.

18. The vacuum insulating glass unit of claim 16 wherein the bleed chamber has an annular configuration.

19. The vacuum insulating glass unit of claim 18 wherein the annular configuration of the bleed chamber entirely surrounds the between-pane space.

20. The vacuum insulating glass unit of claim 16 wherein the seal creates a substantially hermetic seal between the first and second panes.

21. The vacuum insulating glass unit of claim 16 wherein the gas pressure of the bleed chamber is 770 torr or higher.

22. The vacuum insulating glass unit of claim 16 wherein the bleed chamber is mounted against edges of the first and second panes.

23. The vacuum insulating glass unit of claim 16 wherein the bleed chamber has a greater width, measured perpendicular to major surfaces of the first and second panes, than does the between-pane space.

24. The vacuum insulating glass unit of claim 16 wherein the first pane and the second pane are the only panes of the vacuum insulating glass unit.

25. The vacuum insulating glass unit of claim 16 wherein the seal is a glass frit.

26. A vacuum insulating glass unit comprising a first pane and a second pane assembled in a spaced-apart configuration so as to have a between-pane space located between them, the between-pane space having a high vacuum, the vacuum insulating glass unit further comprising a bleed chamber, the bleed chamber being filled with thermally insulative gas at a pressure higher than atmospheric pressure and configured such that over time thermally insulative gas from the bleed chamber diffuses into the between-pane space, the thermally insulative gas being noble gas or a mix of noble gas and air, the pressure in the bleed chamber being characterized by a gas pressure of 765 torr or higher, wherein the first and second panes define confronting interior surfaces, and the bleed chamber is bounded by the confronting interior surfaces of the first and second panes.

27. The vacuum insulating glass unit of claim 26 comprising an edge region delineating a perimeter of the vacuum insulating glass unit, the first and second panes having between them a first seal that extends about the perimeter and a second seal spaced inwardly from the first seal, the bleed chamber being located peripherally inside of the edge region and between the first and second seals.

28. The vacuum insulating glass unit of claim 26 wherein the gas pressure of the bleed chamber is 770 torr or higher.

29. The vacuum insulating glass unit of claim 26 comprising a first seal and a second seal, the confronting interior surfaces of the first and second panes together with the first seal forming the between-pane space, the bleed chamber being located along a perimeter of the vacuum insulating glass unit between the first seal and the second seal, the first seal and the second seal each consisting of a single bead of polymer sealant.

30. The vacuum insulating glass unit of claim 26 further comprising an evacuation and/or fill tube mounted so as to extend through a hole in one of the panes, such that one end of said tube communicates with the between-pane space.

31. The vacuum insulating glass unit of claim 26 wherein the first pane and the second pane are the only panes of the vacuum insulating glass unit.

32. A vacuum insulating glass unit comprising a first pane and a second pane assembled in a spaced-apart configuration so as to have a between-pane space located between them, the between-pane space having a high vacuum, the vacuum insulating glass unit further comprising a bleed chamber, the bleed chamber being filled with thermally insulative gas at a pressure higher than atmospheric pressure and configured such that over time thermally insulative gas from the bleed chamber diffuses into the between-pane space, the thermally insulative gas being noble gas or a mix of noble gas and air, the pressure in the bleed chamber being characterized by a gas pressure of 765 torr or higher,
the vacuum insulating glass unit further comprising a third pane spaced apart from both the first and second panes such that the between-pane space is bounded by the first and second panes while the second pane is located between the first and third panes wherein the first and third panes define confronting interior surfaces, and a peripheral region of the bleed chamber is bounded by the confronting interior surfaces of the first and third panes.

33. The vacuum insulating glass unit of claim 32 wherein the second and third panes define confronting interior surfaces, and a central region of the bleed chamber is bounded by the confronting interior surfaces of the second and third panes.

34. The vacuum insulating glass unit of claim 33 wherein the peripheral region of the bleed chamber surrounds the central region of the bleed chamber.

35. The vacuum insulating glass unit of claim 32 further comprising an edge region delineating a perimeter of the vacuum insulating glass unit, the first and third panes having between them a first seal that extends about the perimeter, the bleed chamber located peripherally inside of the edge region.

36. The vacuum insulating glass unit of claim 35 wherein the first and second panes have between them a second seal, and the peripheral region of the bleed chamber is located between the first and second seals.

37. The vacuum insulating glass unit of claim 32 wherein an entire perimeter defined by an edge of the second pane is surrounded by the bleed chamber.

38. The vacuum insulating glass unit of claim 32 wherein the first pane, the second pane, and the third pane are the only panes of the vacuum insulating glass unit.

39. The vacuum insulating glass unit of claim 36 wherein the second seal is exposed to both the thermally insulative gas in the bleed chamber and the between-pane space.

* * * * *